(12) United States Patent
Smith

(10) Patent No.: US 6,177,634 B1
(45) Date of Patent: Jan. 23, 2001

(54) SPLICE CLOSURE

(75) Inventor: Donald J. Smith, Westlake Village, CA (US)

(73) Assignee: Uniseal, Inc., Evansville, IN (US)

(*) Notice: Under 35 U.S.C. 154(b), the term of this patent shall be extended for 0 days.

(21) Appl. No.: 09/110,605

(22) Filed: Jul. 6, 1998

(51) Int. Cl.[7] ............................................... H02G 15/113
(52) U.S. Cl. ................................................................. 174/92
(58) Field of Search ........................... 174/92, 93, 77 R, 174/138 F

(56) References Cited

U.S. PATENT DOCUMENTS

| | | | |
|---|---|---|---|
| 3,337,681 | * 8/1967 | Smith | 174/93 |
| 3,692,926 | * 9/1972 | Smith | 174/92 |
| 4,117,259 | 9/1978 | Giebel et al. | 174/92 |
| 4,742,181 | * 5/1988 | Dienes | 174/93 X |
| 5,136,121 | * 8/1992 | Kluska et al. | 174/93 |
| 5,789,707 | * 8/1998 | Damm et al. | 174/77 R X |
| 5,793,921 | * 8/1998 | Wilkins et al. | 174/77 R X |

FOREIGN PATENT DOCUMENTS

0778643 A1    11/1997   (EP).

OTHER PUBLICATIONS

RXS Brochure–Universal Closure UCN (2 pages)., No date.
Preformed Line Products Brochure–Splice Case (2 pages)., No date.
PSI Telecommunications Brochure (1 page) No date.
PCT International Search Reported dated Oct. 12, 1999.

* cited by examiner

Primary Examiner—Kristine Kincaid
Assistant Examiner—Chau N. Nguyen
(74) Attorney, Agent, or Firm—Barnes & Thornburg

(57) ABSTRACT

The splice closure includes a tubular protective case having front and back covers. The left and right ends of the back cover are configured to form integrally therewith left rear and right rear half end seals, which are adapted to mate with separately-formed, left front and right front half end seals. Left front and right front half end seals are formed to fit inside the left and right ends of the front cover. The separately-formed, left front half end seal is secured to the integrally-formed, left rear half end seal, with a first set of cables clamped between the mating surfaces thereof. Likewise, the separately-formed, right front half end seal is secured to the integrally-formed, right rear half end seal, with a second set of cables clamped between the mating surfaces thereof. The two cables are spliced together and the front cover is bolted in place over the back cover/spliced cables/end seal assembly to form the protective case. Before the two covers are bolted together, a sealant is disposed between the mating surfaces of the front and back covers and between the outer surfaces of the separately-formed, left front and right front half end seals and the interior surfaces of the front cover to prevent extraneous material, such as water, dust, debris, snow, etc. from entering the protective case.

5 Claims, 6 Drawing Sheets

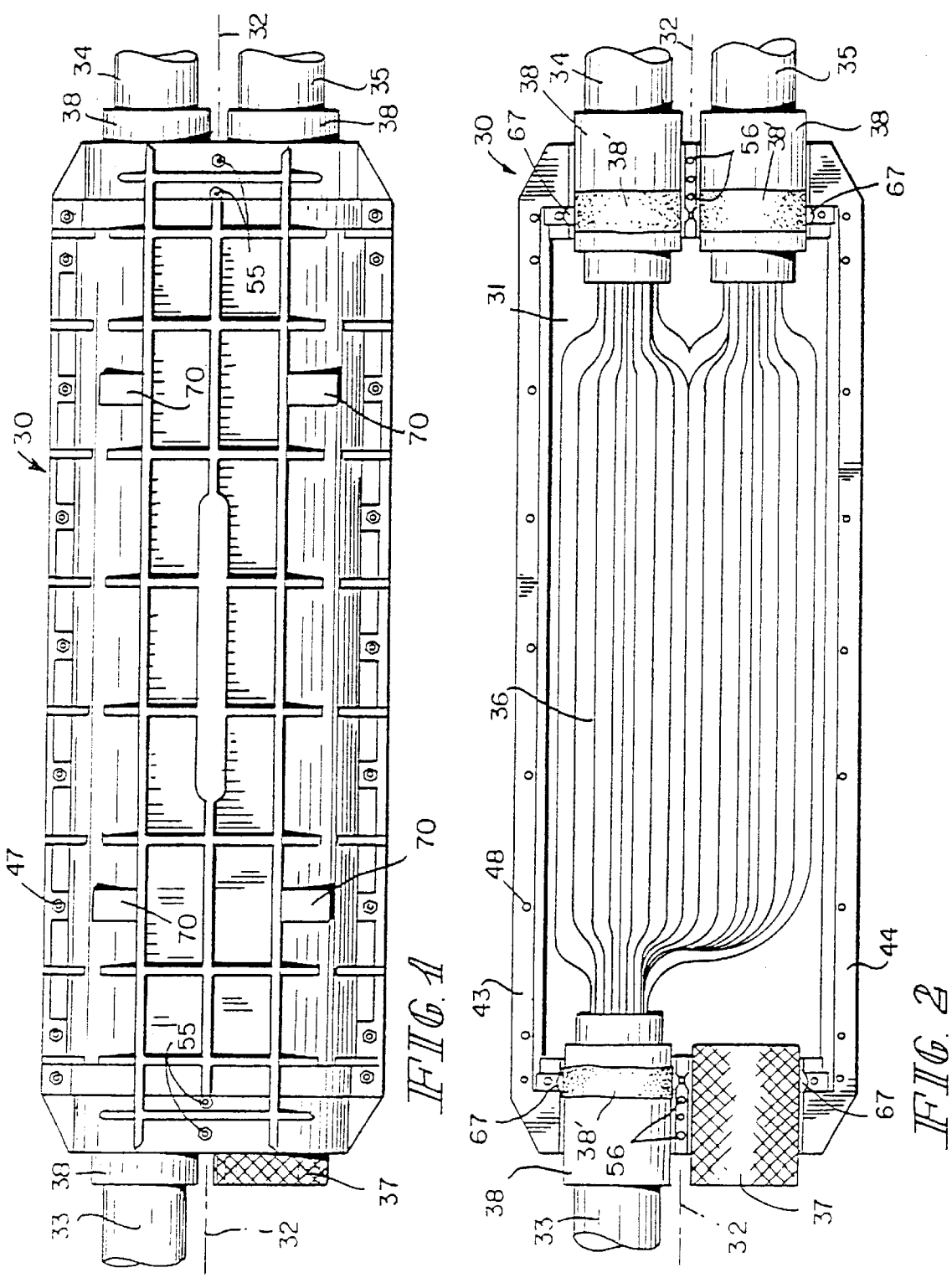

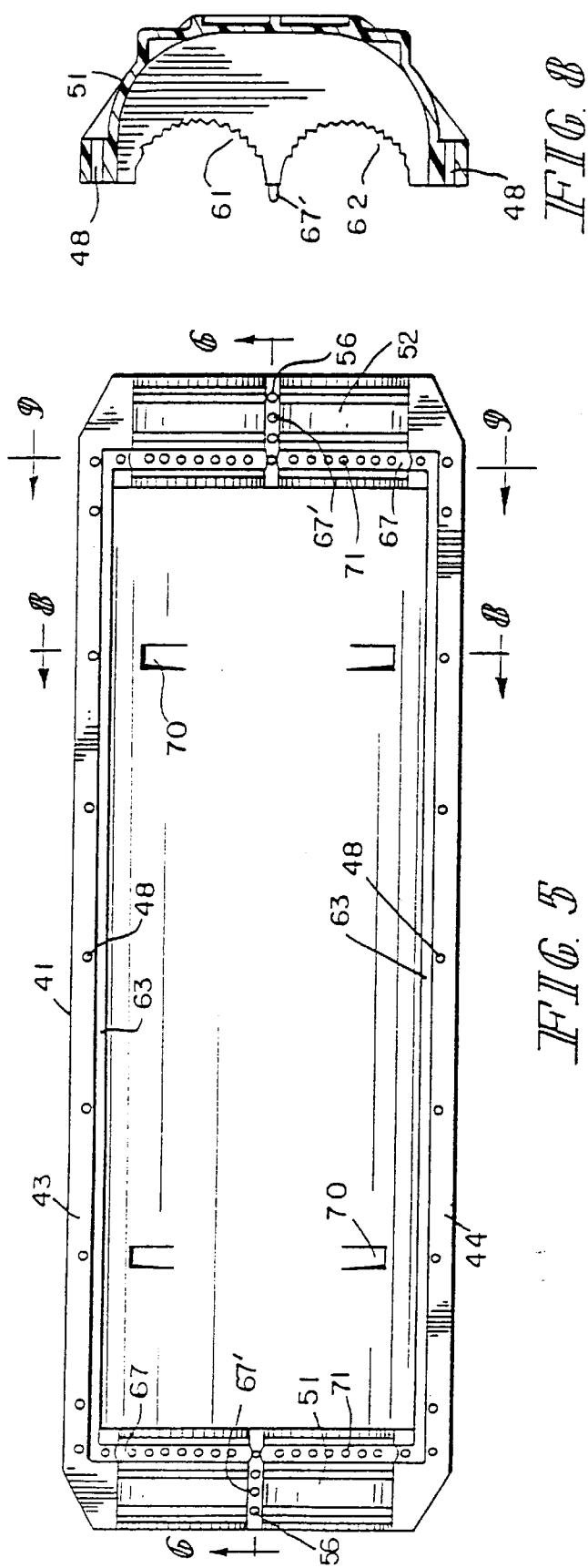
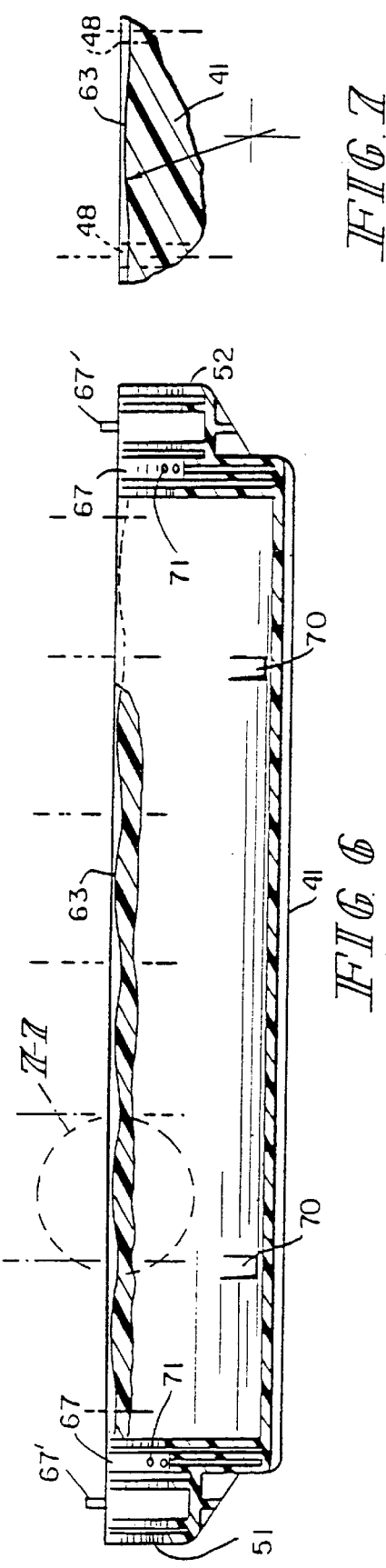

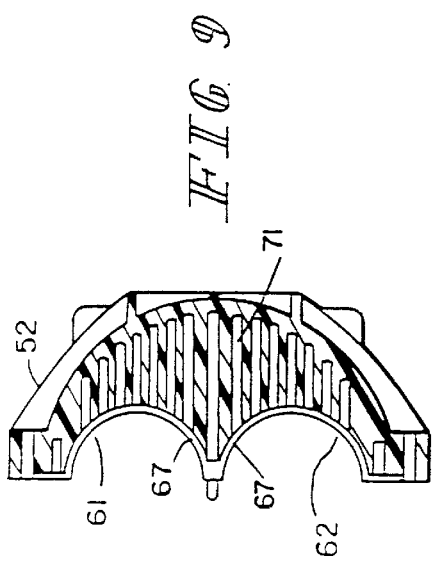
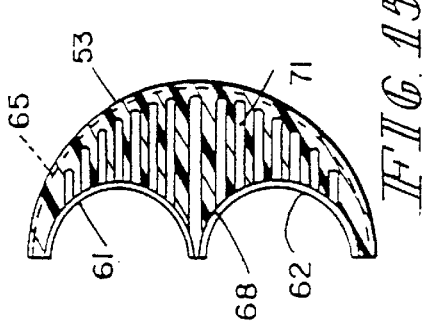
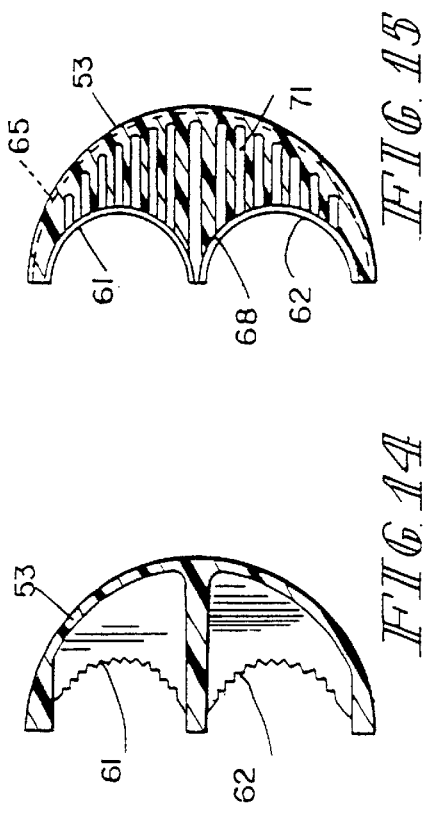
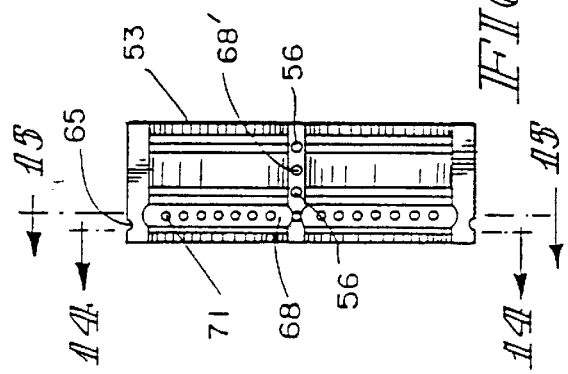

SPLICE CLOSURE

BACKGROUND AND SUMMARY OF THE INVENTION

The present invention generally relates to a splice closure for protecting spliced communication cables. More particularly, this invention relates to a reenterable and reusable splice closure.

The telecommunications industry utilizes cables comprising numerous individual conductors, such as copper wire or fiberoptic conductors. In the laying of the communications cables, it is often necessary to splice sections of these cables. Also, the communication cables sometimes get damaged during their use due to a variety of factors, such as high wind, storm, snow, etc. When they are damaged, it is necessary to splice together the damaged sections of the cable. Typically, a splice closure is positioned around the splice to protect the exposed conductors from the elements, and also to protect the splice from the lateral and vertical forces.

A reference may be made to U.S. Pat. No. 3,337,681 for a description of a prior art splice closure. Such splice closure includes a protective tubular case comprising two semicircular half tubular members, with circular end seals disposed inside the tubular case at each end. Each of the end seals, in turn, comprises two semicircular half end seals, and are configured to form a longitudinal cavity through which cables enter the protective case to form a splice. A liner made from a flexible material, such as Neoprene, is bonded to the inside surface of the tubular case. The liner seals the joints between the two half tubular members and between the end seals and the tubular case.

The present invention relates to an improved splice closure with fewer parts, relatively inexpensive to manufacture, easy to assemble and disassemble-especially in the field and capable of being sealed, unsealed and resealed.

According to the present invention, the splice closure includes a tubular protective case comprising back and front covers. The left and right ends of the back cover are configured to form integrally therewith left rear and right rear half end seals, which are adapted to mate with separately-formed, left front and right front half end seals. The left front and right front half end seals are formed to fit inside the left and right ends of the front cover. The separately-formed, left front half end seal is secured to the integrally-formed, left rear half end se with a first set of cables clamped between the mating surfaces thereof. Likewise, the separately-formed, right front half end seal is secured to the integrally-formed, right rear half end seal, with a second set of cables clamped between the mating surfaces thereof. The two sets of cables are spliced together and the front cover is bolted in place over the back cover/spliced cables/end seal assembly to form the protective case. Before the two covers are bolted together, a sealant is disposed between the mating surfaces of the front and back covers and between the outer surfaces of the left front and right front half end seals and the interior surfaces of the front cover to prevent extraneous material, such as water, dust, debris, snow, etc. from entering the protective case.

In the preferred embodiments, the mating surfaces of the two covers are formed to include a longitudinal sealing groove, and the outer peripheral surfaces of the separately-formed, left front and right front half end seals and the inner peripheral surfaces of the front cover are formed to include a circumferential sealing groove. A strip of composite sealing material, comprising a substantially non-tacky, resilient and yieldable sealant attached to an adhesive substrate, is disposed in the longitudinal sealing grooves in the back cover and in the outer circumferential sealing grooves in the left front and right front half end seals to seal the respective joints. The composite sealing material is disposed in the longitudinal and circumferential sealing grooves with the adhesive substrate contacting and adhering to the sealing grooves and with the non-tacky sealant facing away from the sealing grooves. This facilitates removal of the front cover from the back cover/spliced cables/end seal assembly for repairs or inspection without damaging the sealant. Upon completion of the work, the front cover is merely re-bolted in place.

In further preferred embodiments, the longitudinal grooves in the two covers have a wave-form cross-section to compensate for the variation in pressure that occurs when the two covers are bolted together.

In still further preferred embodiments, the end sections of the cables are first wrapped with a narrow strip (about ½ inch wide) of soft and sticky sealing material (such as mastic sealant), then wrapped with a sizing tape (about 4 inches wide) and then finally with a strip of composite sealing material (about 1 inch wide) (with the adhesive substrate contacting and adhering to the sizing tape) before the cables are clamped between the respective half end seals.

Additional features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 1 is a front view of the completely assembled splice closure of the present invention, with the cables and the front cover installed, FIG. 2 is a front view of the FIG. 1 splice closure, with the cables installed and spliced, but without the separately-formed, left front and right front half end seals and without the front covers, FIG. 5 is a front view of the back cover having a bathtub-like configuration, FIG. 6 is a cross-sectional view of the back cover taken along the line 6—6 in FIG. 5, with a portion broken away to show the details of the longitudinal grooves arranged in the top and bottom flanges of the back cover, FIG. 7 is an enlarged view of a section of a longitudinal groove showing its wave-form configuration relative to the apertures for the nut and bolt combinations used to secure the front and back covers, FIG. 8 is a cross-sectional view of the back cover taken along the line 8—8 in FIG. 5, and showing the integrally-formed, left rear half end seal having two semicircular longitudinal cavities with serrated interior surfaces, FIG. 9 is a cross-sectional view of the back cover taken along the line 9—9 in FIG. 5, and showing the integrally-formed, right rear half end seal having two semicircular longitudinal cavities and a plurality of coring holes therein, FIG. 13 is a back view of the left front half end seal, FIGS. 14 is a cross-sectional view of the left front half end seal (similar to FIG. 8) taken along the line 14—14 in FIG. 13, and showing the serrated interior surfaces of the two longitudinal semicircular cavities formed therein, and FIGS. 15 is a cross-sectional view of the left front half end seal (similar to FIG. 9) taken along the line 15—15 in FIG. 13, and showing the inner and outer circumferential sealing grooves and further showing a plurality of coring holes formed therein.

DETAILED DESCRIPTION OF THE DRAWINGS

Figure 3:
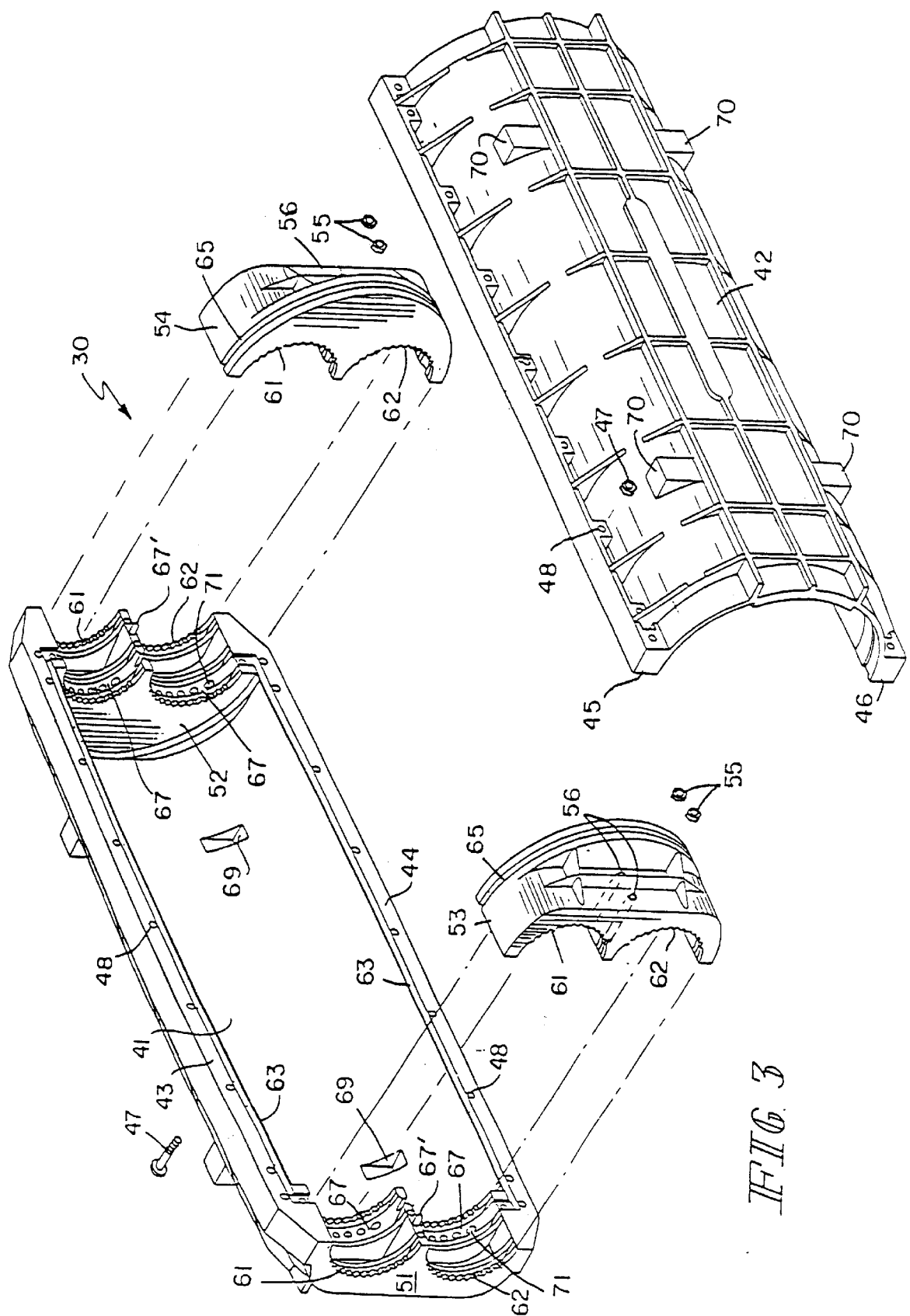
FIG. 3 is a left, front and top exploded perspective view of the splice closure of FIGS. 1,2, showing the back cover with integrally-formed, left rear and right rear half end seals, separately-formed left front and right front half end seals and the front cover.

As illustrated in FIGS. 1–2, the splice closure 30, in accordance with the present invention, comprises a tubular protective case 31 having a longitudinal axis 32. A cable 33 enters the left end of the protective case 31 through a generally-circular, left end seal and a pair of cables 34, 35 enter the right end of the protective case through a generally-circular, right end seal to form a splice 36. A blank plug 37 is used to close off one of the two longitudinal cable entrances in the left end seal as shown. Although a typical splice comprises one cable branching into two cables as shown, a splice may also comprise of any one of the following configurations: one cable in and one cable out, two cables in and two cables out and two cables in.

The end sections of the cables 33–35 are wrapped with a narrow strip of soft and sticky sealant, then with a strip of sizing tape and then finally with a strip of composite sealant to make the cables fit tightly in the longitudinal cable entrances in the respective end seals without any gaps. In FIGS. 1, 2, the numeral 38 designates the wrapped portions of the cables 33–35, and numeral 38' designates the outermost wrap of the composite sealant.

As shown in FIG. 3, the tubular protective case 31 comprises a back cover 41 (sometimes referred to herein as a first half tubular member) and a front cover 42. The back and front covers 41, 42 (sometimes referred to herein as a second half tubular member) have a generally semicircular transverse cross-section. The top and bottom edges of the back and front covers 41, 42 are configured to form top and bottom longitudinal flanges 43, 44 and 45, 46, respectively. A plurality of nut and bolt combinations 47 are positioned in the apertures 48 in the adjacent pairs of top and bottom flanges 43, 45 and 44, 46 to secure the front cover 42 to the back cover 41.

The left and right ends of the back cover 41 are formed to define integrally therewith left rear and right rear half end seals 51, 52. The back cover 41 and the two integrally-formed, left rear and right rear half end seals 51, 52 (sometimes referred to herein as first and third half end seals) together form a hollow bathtub-like member. The integrally-formed, left rear and right rear half end seals 51, 52 are adapted to mate with the separately-formed, left front and right front half end seals 53, 54 (sometimes referred to herein as second and fourth half end seals) (also referred to as clamping seals), respectively. The left front and right front half end seals 53, 54 are dimensioned and configured to fit inside the left and right ends of the front cover 42, respectively.

A set of nut and bolt combinations 55 (shown in FIG. 1) are positioned in the apertures 56 in the adjacent pair of left front and left rear half end seals 53, 51 to clamp the separately-formed, left front half end seal to the integrally-formed, left rear half end seal to form the generally circular, left end seal. Similarly, another set of nut and bolt combinations 55 (shown in FIG. 4) are positioned in the apertures 56 in the adjacent pair of right front and right rear half end seals 54, 52 to clamp the separately-formed, right front half end seal to the integrally-formed, right rear half end seal to form the generally circular, right end seal.

Figure 4:
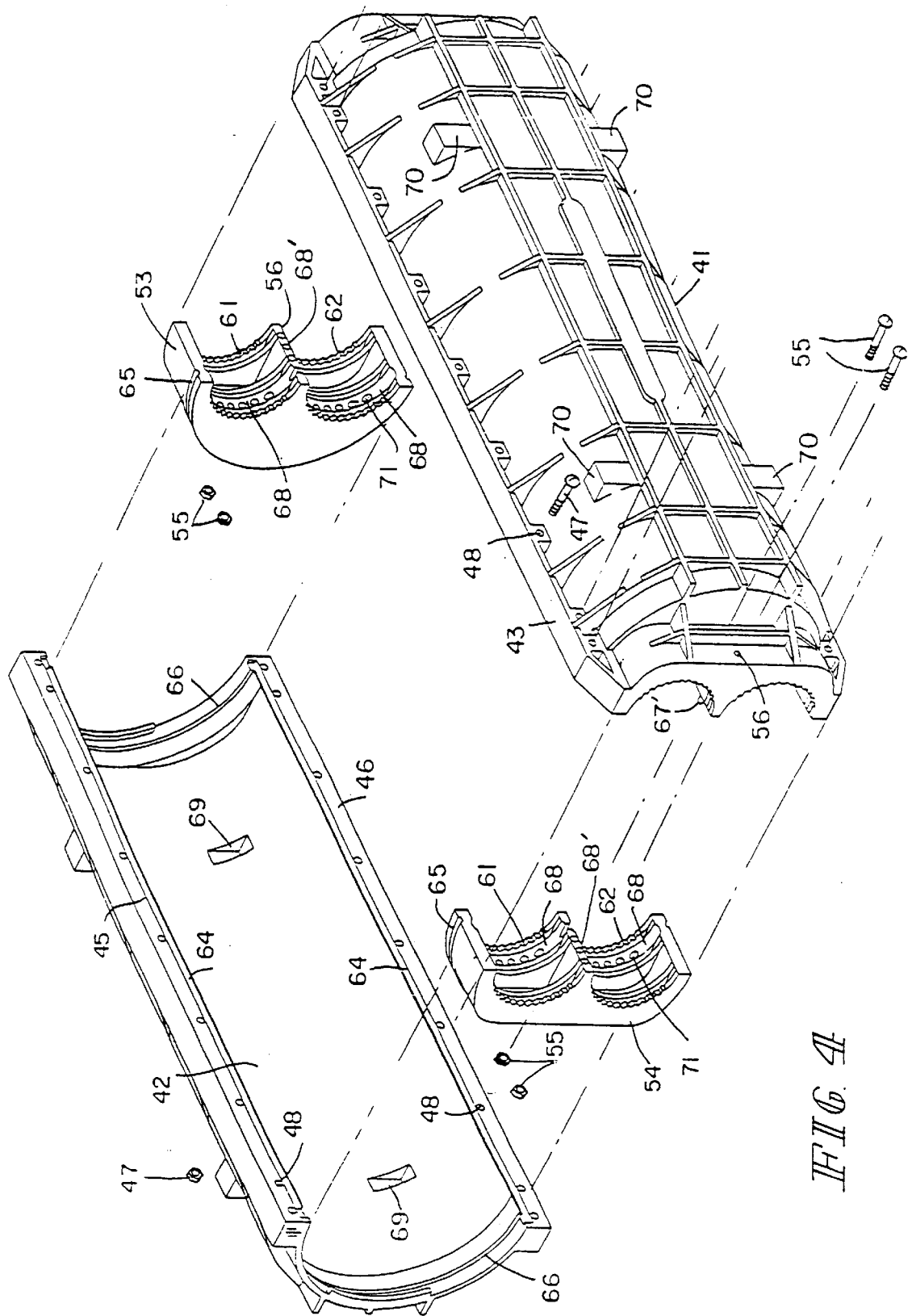
FIG. 4 is an exploded perspective view of the splice closure, similar to FIG. 3, but taken from the back, depicting the internal features of the separately-formed, left front and right front half end seals and the front cover.
Figure 12:
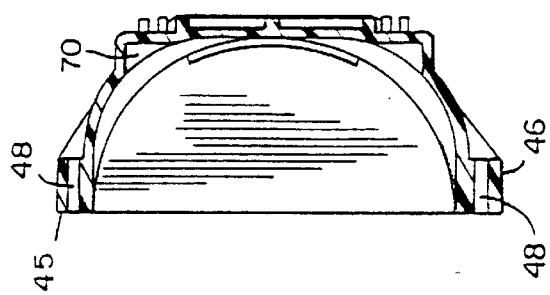
FIGS. 11, 12 are cross-sectional views of the front cover respectively taken along the lines 11—11, 12—12 in FIG. 10.

As shown in FIGS. 3 and 4, each of the four half end seals 51–54 are provided with two longitudinal cavities 61, 62 of a generally semicircular configuration. When the left front half end seal 53 is bolted to the left rear half end seal 51, the corresponding semicircular cavities 61, 62 form two generally circular longitudinal cable entrances. Similarly, when the right front half end seal 54 is bolted to the right rear half end seal 52, the corresponding semicircular cavities 61, 62 form two generally circular longitudinal cable entrances. The inside surfaces of the semicircular longitudinal cavities 61, 62 are jagged or serrated as shown in FIGS. 3, 4, 8 and 14. When the splice closure 30 is assembled, the jagged surfaces of the end seals 51–54 are embedded in the composite sealant and the sizing tape wrapped around the cables 33–35 to form a tight seal between the cables and the splice closure 30. The jagged surfaces of the end seals 51–54 also serve to prevent axial slippage between the cables and the splice closure 30.

Although the end seals 51–54 are each provided with two cable entrances 61, 62 at each end in the particular embodiment shown and described, it is contemplated that each of the end seals may instead be provided with three (or more) cable entrances depending on the application.

Figure 10:
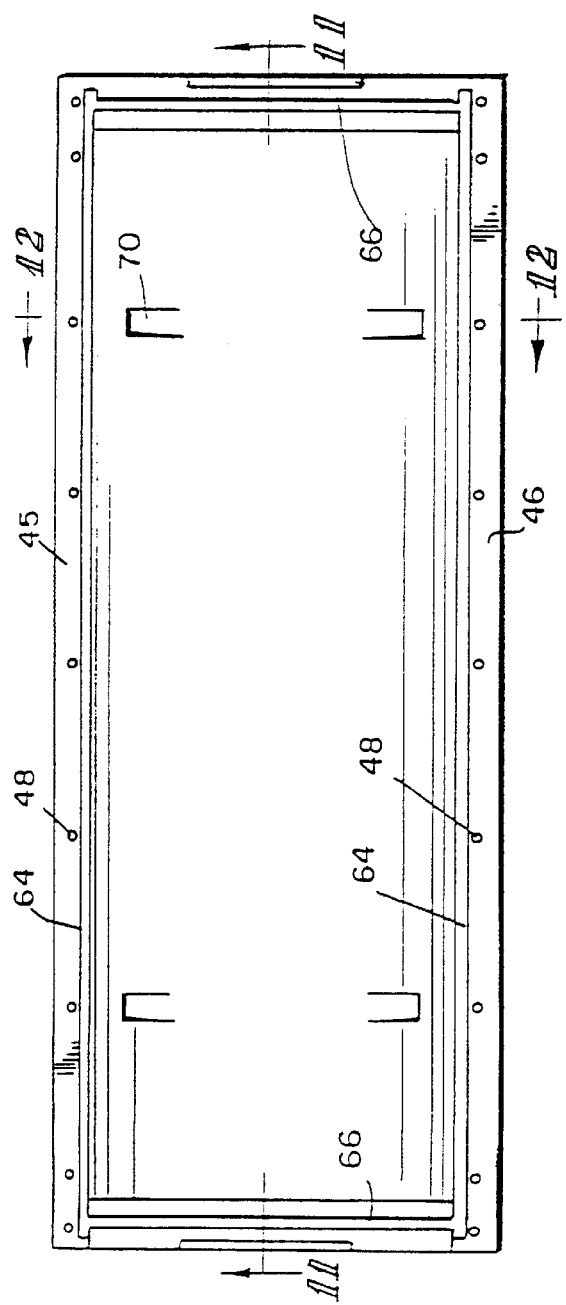
FIG. 10 is a back view of the front cover.
Figure 11:
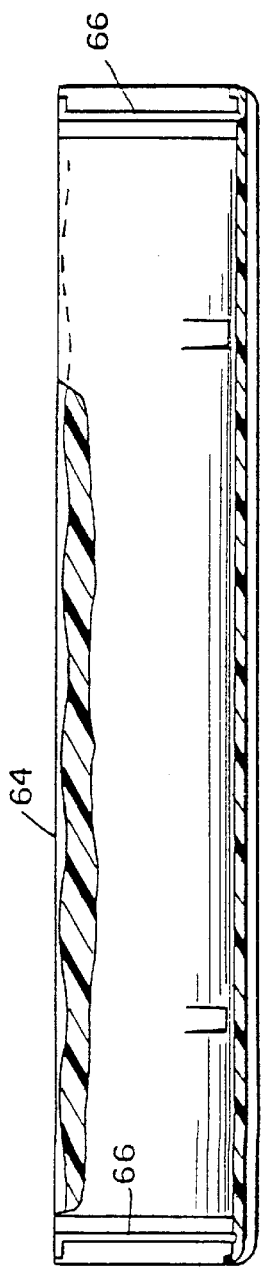

As shown in FIGS. 3, 5 and 6, the top and bottom flanges 43, 44 of the back cover 41 are provided with a pair of longitudinal sealing grooves 63 alongside the apertures 48 therein. Likewise, as shown in FIGS. 4, 10 and 11, the top and bottom flanges 45, 46 of the front cover 42 are equipped with a pair of longitudinal sealing grooves 64 alongside the apertures 48 therein.

As shown in FIGS. 3, 4, 13 and 15, the outer peripheral surfaces of the separately-formed, left front and right front half end seals 53, 54 are configured to form outer circumferential sealing grooves 65. The interior surfaces of the front cover 42, on the other hand, are formed to include corresponding inner circumferential grooves 66, as can be seen from FIGS. 4, 10 and 11.

As shown in FIGS. 3, 5, 6 and 9, the inner surfaces of each of the semicircular longitudinal cavities 61, 62 in the integrally-formed, left rear and right rear half end seals 51, 52 are configured to include inner circumferential sealing grooves 67. Similarly, as shown in FIGS. 4, 13 and 15, the inner surfaces of each of the semicircular longitudinal cavities 61, 62 in the separately-formed, left front and right front half end seals 53, 54 are formed to include inner circumferential sealing grooves 68.

In operation, to splice the cables 33–35, the respective end sections of the entering cables are wrapped with a narrow (about ½ inch wide) strip of soft and sticky sealing material, then wrapped with a sizing tape (about 4 inches wide) and finally wrapped with a further layer of composite sealing material (about 1 inch wide) (with the adhesive substrate facing the sizing tape). The layers 38 of the composite sealing material and the sizing tape wrapped around the cables 33–35 form a cross-section just barely larger than the cross-section of the generally circular, longitudinal cable entrances in the left and right end seals. A simple (throw-away) cardboard gauge may be supplied to the field technician to determine when a sufficient number of turns of the sealing material and the sizing tape have been applied to the cables.

The innermost wrap of soft and sticky sealing material serves to close any gap between the cables 33–35 and the innermost layer of the sizing tape. The soft and sticky sealing material may be a suitable mastic sealant.

Later removal of the sticky mastic material from the cables 33–35 is not important. As explained later, only the front cover 42 is removed for repairs or inspection of the splice 36, and the back cover/spliced cables/end seal assembly is left undisturbed during such work.

When assembled, the outermost wrap of composite sealing material is pressed into the sealing grooves 67, 68 in the end seals to form a tight seal between the sizing tape and the interior surfaces of the cable entrances in the end seals. The composite sealing material may be in the form of a substantially non-adhesive, resilient and yieldable sealant non-releasably secured to an adhesive substrate. The sealant may be selected from a group consisting of EPDM, halogenated butyl, butyl, or some combination thereof, hydrated aluminum, resins, paraffinic oil, halogenated plasticizer, polybutene and polyisobutylene. The adhesive may be selected from a group consisting of butyl, halogenated butyl, or some combination thereof, hydrated aluminum, resinic polybutenes, halogenated paraffin and polyisobutylene. A reference may be made to the U.S. patent application, Ser. No. 08/783,693, filed on Jan. 15, 1997, for a more detailed description of the composite sealing material of this type.

The sizing tape may be a weather-proof and solvent proof hard tape (such as Neoprene, EPDM, etc.), having on one side thereof spaced-apart narrow strips of sticky substance (to hold it in place during assembly) and having on the other side thereof a coating of high friction material (to prevent the successive turns of the sizing tape from sliding over each other or slide over the cable).

To continue the assembly, the back cover 41 is drawn against the end sections of the cables 33–35. The separately-formed, left front half end seal 53 is then bolted to the integrally-formed, left rear half end seal 51, with the taped section 38 of the cable 35 and the blank plug 37 clamped tightly between the left front and left rear half end seals. Similarly, the separately-formed, right front half end seal 54 is bolted to the integrally-formed, right rear half end seal 52, with the taped sections 38 of the cables 34, 35 clamped tightly between the right front and right rear half end seals. The composite sealant wrapped around the sizing tape is pressed into the inner circumferential sealing grooves 67, 68 to form a tight seal between the cables 33–35 and the left and right end seals.

As shown in FIGS. 3–6, 8, 9 and 13, the integrally-formed, left rear and right rear half end seals 51, 52 are provided with locator pins 67' for reception in the corresponding apertures 68' in the separately-formed, left front and right front half end seals 53, 54 to facilitate the alignment of the left and right half end seals 51–54.

The composite sealant is also disposed in the longitudinal sealing grooves 63 in the top and bottom flanges 43, 44 in the back cover 41 and in the outer circumferential sealing grooves 65 in the separately-formed, left front and right front half end seals 53, 54, with the adhesive contacting and adhering to the longitudinal and circumferential sealing grooves and the sealant facing away from the grooves. When the front cover 42 is bolted into place over the back cover/spliced cables/end seal assembly, the composite sealant is pressed into the longitudinal sealing grooves 64 in the top and bottom flanges 45, 46 of the front cover and into the inner circumferential sealing grooves 66 of the front cover to securely seal the joint between the adjacent flanges 43, 45 and 44, 46 of the two covers 41, 42 and the joint between the left front and right front half end seals 53, 54 and the front cover.

When the front cover 42 is removed for access to the splice 36 (which is frequent in the telecommunications work), there is no disturbance to the splice or to the cables 33–35. The cables 33–35 remain firmly clamped (and undisturbed) between the end seals 51–54 while the repair or inspection work is being done on the splice 36 or the cables 33–35. This negates the need to use struts or tie bars between the end plates, as is necessary in other commonly used splice closures, to keep the end plates separated while the repair or inspection work is being carried out. The splice 36 is thus protected from the lateral tensile, as well as the vertical shear forces during any repair or inspection operation. Upon completion of the work, the front cover 42 is merely re-bolted into place over the back cover/spliced cables/end seal assembly.

As shown in FIGS. 6, 7 and 10, the longitudinal sealing grooves 63, 64 in the flanges 43–46 of the back and front covers 41, 42 (in which a strip of composite sealant is placed) are provided with a waveform configuration - high in the region closest to the apertures 48 (in which the nut/bolt combinations 47 are received to attach the two covers 41, 42) and low in the region between the successive openings. The waveform configuration of these grooves 63, 64 compensates for the difference in pressure as the bolts 47 are tightened, so as to achieve more uniform pressure on the sealant along the grooves and to avoid any leaks.

The front and back covers 41, 42 and the two end seals 53, 54 are made from high strength polypropylene. However, any suitable high strength plastic or stainless steel may be used for the covers or the end seals.

One particular model of the splice closure 30 has the following dimensions: The overall length of the splice closure 30 is about 36". The outside diameter of the splice closure 30 is about 12". The outside diameter of the left and right front half end seals is about 9.6". The center-to-center spacing between the two semicircular cavities 61, 62 in the end seals 51–54 is about 4.4". The diameter of the two semicircular cavities 61, 62 in the end seals 51–54 is about 4". The radius of the sealing grooves 63–66 is about 0.15". The radius of the inner circumferential sealing grooves 67, 68 in the end seals 51–54 is about 0.3". The center-to-center spacing between the apertures 48 in the longitudinal flanges 43–46 is about 4.625".

As shown in FIG. 2, the front cover 42 has two molded-in places 69 to retain a set of spare fasteners for use in the field. The spare fasteners can be supplied with the splice closure 30 from the factory. Also, the back and front covers 41, 42 are each equipped with four molded-in blank sections 70 for later openings. These blank sections 70 can be subsequently used for either air-pressure entries into the splice closure 30 or for pouring a setting-type polyurethane compound into the splice enclosure. The polyurethane compound is a commonly used sealant in the telecommunications industry.

As shown in FIGS. 3–6, 9, 13 and 15, each of the molded half end seals 51–54 are provided with coring holes 71 to achieve uniform wall thickness in order to minimize warping, sink marks etc. during cooling.

As can be seen from the foregoing description, the subject splice closure has fewer parts, relatively inexpensive to manufacture, easy to assemble and disassemble-especially in the field, has low maintenance and can be used and re-used.

Although the present invention has been described in detail with reference to certain preferred embodiments, variations and modifications exist within the scope and spirit of the present invention as described and as defined in the following claims.

What is claimed is:

1. A splice closure apparatus comprising:

a tubular protective case having a longitudinal axis and comprising first and second half tubular members, each of the half tubular members having a flange on each side thereof, wherein the first and second ends of the first half tubular member are formed to define integrally therewith first and third half end seals, each of the integrally-formed, first and third half end seals having a mating surface, separately-formed, second and fourth half end seals being configured to fit inside the first and second ends of the second half tubular member, each of the second and fourth half end seals having a mating surface, means for sealingly securing the separately-formed, second half end seal to the integrally-formed, first half end seal such that the respective mating surfaces thereof define a longitudinal cable entrance at the first end of the protective case through which a first cable passes into the protective case, means for sealingly securing the separately-formed, fourth half end seal to the integrally-formed, third half end seal such that the respective mating surfaces thereof define a longitudinal cable entrance at the second end of the protective case through which a second cable passes into the protective case to form a splice with the first cable, and means for sealingly securing the adjacent flanges of the two half tubular members for forming the protective case for the splice, wherein sealing material is disposed between the respective flanges of the first and second half tubular members, wherein the sealing material is a composite comprising a substantially non-tacky, resilient and yieldable sealant non-releasably secured to an adhesive substrate, wherein mating surface of each of the flanges of the first and second half tubular members is formed to include a longitudinal sealing groove, and wherein the sealing material is disposed in the longitudinal sealing grooves in the first half tubular member with the adhesive facing and contacting the longitudinal sealing grooves and the non-tacky, resilient sealant facing and contacting the longitudinal sealing grooves in the second half tubular member.

2. A splice closure apparatus comprising:

a tubular protective case having a longitudinal axis and comprising, first and second half tubular members, each of the half tubular members having a flange on each side thereof, wherein the first and second ends of the first half tubular member are formed to define integrally therewith first and third half end seals, each of the integrally-formed, first and third half end seals having a mating surface, separately-formed, second and fourth half end seals being configured to fit inside the first and second ends of the second half tubular member, each of the second and fourth half end seals having a mating surface, means for sealingly securing the separately-formed, second half end seal to the integrally-formed, first half end seal such that the respective mating surfaces thereof define a longitudinal cable entrance at the first end of the protective case through which a first cable passes into the protective case, means for sealingly securing the separately-formed, fourth half end seal to the integrally-formed, third half end seal such that the respective mating surfaces thereof define a longitudinal cable entrance at the second end of the protective case through which a second cable passes into the protective case to form a splice with the first cable, and means for sealingly securing the adjacent flanges of the two half tubular members for forming the protective case for the splice, wherein the sealing material is disposed between the outer peripheral surfaces of the separately-formed, second and fourth half end seals and the inner peripheral surfaces of the second half tubular member, wherein the sealing material is a composite comprising a substantially non-tacky, resilient and yieldable sealant non-releasably secured to an adhesive substrate, wherein each of the separately-formed, second and fourth half end seals is formed to include a circumferential sealing groove around the outer peripheral surface thereof, wherein each end of the second half tubular member is formed to include a corresponding circumferential sealing groove around the inner peripheral surface thereof, and wherein the composite sealant is disposed in each of the outer circumferential sealing grooves in the second and fourth half end seals with the adhesive facing and contacting the outer circumferential sealing grooves and the non-tacky, resilient sealant facing and contacting the inner circumferential sealing grooves in the second half tubular member to form a seal between the outer peripheral surfaces of the second and fourth half end seals and the respective inner peripheral surfaces of the second half tubular member when the two half tubular members are joined together.

3. A splice closure apparatus comprising:

a tubular protective case having a longitudinal axis and comprising first and second half tubular members, each of the half tubular members having a flange on each side thereof, wherein the first and second ends of the first half tubular member are formed to define integrally therewith first and third half end seals each of the integrally-formed, first and third half end seals having a mating surface, separately-formed, second and fourth half end seals being configured to fit inside the first and second ends of the second half tubular member, each of the second and fourth half end seals having a mating surface, means for sealingly securing the separately-formed, second half end seal to the integrally-formed, first half end seal such that the respective mating surfaces thereof define a longitudinal cable entrance at the first end of the protective case through which a first cable passes into the protective case, means for sealingly securing the separately-formed, fourth half end seal to the integrally-formed, third half end seal such that the respective mating surfaces thereof define a longitudinal cable entrance at the second end of the protective case through which a second cable passes into the protective case to form a splice with the first cable, and means for sealingly securing the adjacent flanges of the two half tubular members for forming the protective case for the splice, wherein mating surface of each of the flanges of the first and second half tubular members is formed to include a longitudinal sealing groove, wherein sealing material is disposed in the longitudinal sealing grooves between the respective flanges of the first and second half tubular members, wherein the means for securing the adjacent flanges of the two half tubular members comprises a plurality of spaced-apart fasteners disposed alongside the longitudinal sealing grooves, and wherein each of the longitudinal sealing grooves is formed to have a wave-form longitudinal cross-section such that it is shallower in the region between the fasteners and deeper in the region most adjacent to the fasteners.

4. The apparatus of claim 3, wherein the fasteners comprise a plurality of nut and bolt combinations.

5. The apparatus of claim 3, wherein the means for securing the separately-formed, second half end seal to the integrally-formed, first half end seal and for securing the separately-formed, fourth half end seal to the integrally-formed, third half and seal comprises nut and bolt combinations.

* * * * *